(12) United States Patent
Yan et al.

(10) Patent No.: US 9,379,809 B2
(45) Date of Patent: Jun. 28, 2016

(54) METHOD AND DEVICE FOR REALIZING OPTICAL CHANNEL DATA UNIT SHARED PROTECTION RING

(71) Applicant: Huawei Technologies Co., Ltd., Shenzhen (CN)

(72) Inventors: Jun Yan, Wuhan (CN); Xin Xiao, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/718,172

(22) Filed: May 21, 2015

(65) Prior Publication Data
US 2015/0256250 A1    Sep. 10, 2015

Related U.S. Application Data

(63) Continuation of application No. 13/309,312, filed on Dec. 1, 2011, now Pat. No. 9,071,456, which is a continuation of application No. PCT/CN2009/072133, filed on Jun. 4, 2009.

(51) Int. Cl.
*H04J 14/00*    (2006.01)
*H04B 10/03*    (2013.01)
(Continued)

(52) U.S. Cl.
CPC ............... *H04B 10/03* (2013.01); *H04B 10/27* (2013.01); *H04J 3/085* (2013.01); *H04J 3/1652* (2013.01); *H04L 12/437* (2013.01); *H04L 41/0668* (2013.01); *H04J 2203/006* (2013.01)

(58) Field of Classification Search
CPC ......... H04B 10/03; H04B 10/27; H04J 3/085; H04J 3/1652; H04J 2203/006; H04L 12/437; H04L 41/0668

USPC ................ 398/1, 3, 4, 5, 7, 12, 19, 45, 51, 54
See application file for complete search history.

(56) References Cited

U.S. PATENT DOCUMENTS 6,748,171 B1    6/2004  Homayoun et al.
7,561,795 B2 *  7/2009  Mascolo ................... H04J 3/14
                                                 370/216

(Continued)

FOREIGN PATENT DOCUMENTS

CN    1744448 A      3/2006
CN    101145839 A    3/2008
(Continued)

OTHER PUBLICATIONS

Bellato, A., "G.873.2 Draft New Recommendation," ITU-T Drafts, International Telecommunication Union, Geneva, CH, Study Group:15, Working Party:3, Intended type of document (R-C-D-TD):WD 04, Source:Alcatel, May 15, 2003, pp. 1-13, XP017505083.

(Continued)

*Primary Examiner* — M. R. Sedighian
(74) *Attorney, Agent, or Firm* — Slater Matsil, LLP

(57) ABSTRACT

A method and a device for realizing an optical channel data unit (ODU) shared protection ring (SPRing) are disclosed by the present invention. The method includes: first, receive an ODUj, wherein the ODUj carries an ODUi; then, perform de-multiplexing processing to obtain the ODUi from the ODUj; next, multiplex the ODUi to an optical channel data unit k (ODUk); meanwhile, keep monitoring the ODUk; and when the monitoring result that is obtained through monitoring the ODUk indicates that a failure has occurred, perform a switching on the ODUi; wherein i, j, k are integers equal to or larger than 0, k is larger than j, j is larger than i, and i, j, k are used to indicate different rates of respective optical channel data unit (ODU) signals.

8 Claims, 7 Drawing Sheets

(51) Int. Cl.
*H04J 3/16* (2006.01)
*H04L 12/437* (2006.01)
*H04L 12/24* (2006.01)
*H04J 3/08* (2006.01)
*H04B 10/27* (2013.01)

(56) References Cited

U.S. PATENT DOCUMENTS

| | | | |
|---|---|---|---|
| 7,742,502 B2* | 6/2010 | Vissers | H04J 3/1658 370/389 |
| 7,778,236 B2 | 8/2010 | Yu | |
| 7,782,843 B2* | 8/2010 | Zou | H04J 3/1652 370/360 |
| 7,848,653 B2 | 12/2010 | Zou | |
| 7,936,990 B2 | 5/2011 | Yan et al. | |
| 7,948,975 B2* | 5/2011 | Markus | H04L 49/1523 370/366 |
| 8,160,445 B2 | 4/2012 | Lanzone et al. | |
| 8,189,485 B2 | 5/2012 | Yan | |
| 2002/0114031 A1 | 8/2002 | Yamada | |
| 2003/0206515 A1 | 11/2003 | Licata et al. | |
| 2004/0076114 A1* | 4/2004 | Miriello | H04J 14/0283 370/222 |
| 2004/0193724 A1 | 9/2004 | Dziong et al. | |
| 2006/0104309 A1 | 5/2006 | Vissers et al. | |
| 2007/0292129 A1 | 12/2007 | Yan et al. | |
| 2008/0069563 A1 | 3/2008 | Wang | |
| 2009/0175618 A1* | 7/2009 | Yan | H04J 3/1652 398/25 |
| 2009/0207727 A1 | 8/2009 | Zeng | |

FOREIGN PATENT DOCUMENTS

| | | |
|---|---|---|
| EP | 1411665 A1 | 4/2004 |
| EP | 1777845 A1 | 4/2007 |
| JP | 2002247038 | 8/2002 |
| JP | 2004320347 A | 11/2004 |
| JP | 2005286961 A | 10/2005 |
| JP | 2005348165 A | 12/2005 |
| RU | 2005135117 A | 5/2007 |
| WO | 2006128368 A1 | 12/2006 |
| WO | 2008052436 A1 | 5/2008 |

OTHER PUBLICATIONS

"Interfaces for the Optical Transport Network (OTN)," International Telecommunication Union, ITU-T Telecommunication Standardization Sector of ITU, G.709/Y.1331, Mar. 2003, pp. 1-118.

"Corrigendum 1," International Telecommunication Union, ITU-T Telecommunication Standardization Sector of ITU, G.798, Jan. 2009, pp. 1-8.

"Characteristics of Transport Equipment—Description Methodology and Generic Functionality," International Telecommunication Union, ITU-T Telecommunication Standardization Sector of ITU, G.806, Jan. 2009, pp. 1-152.

"Terms and Definitions for Optical Transport Networks (OTN)," International Telecommunication Union, ITU-T Telecommunication Standardization Sector of ITU, G.870/Y.1352, Mar. 2008, pp. 1-28.

"Optical Transport Network (OTN): Linear Protection," International Telecommunication Union, ITU-T Telecommunication Standardization Sector of ITU, G.873.1, Mar. 29, 2006, pp. 1-24, XP017467829.

Vissers, M., "HO and LO ODUk Shared Ring Protection (SRP)," International Telecommunication Union, Source: Huawei Technologies Co., Ltd., China Mobile Communications Corporation, China Acedemy of Telecommunication Research, MII,Sep. 2009, pp. 1-8, XP017447231.

* cited by examiner

METHOD AND DEVICE FOR REALIZING OPTICAL CHANNEL DATA UNIT SHARED PROTECTION RING

This application is a continuation of U.S. patent application Ser. No. 13/309,312, filed on Dec. 1, 2011, which is a continuation of International Application No. PCT/CN2009/072133, filed on Jun. 4, 2009, The afore-mentioned patent applications are hereby incorporated by reference in their entireties.

TECHNICAL FIELD

The present invention relates to optical communication technology, and in particular to a method and a device for realizing an optical channel data unit (ODU) shared protection ring (SPRing).

BACKGROUND

With the rapid development of data services, a transport network for data services has been developed. An optical transport network (OTN) is a kind of optical transport technology. The OTN includes an optical channel (OCh), an optical multiplex section (OMS), and an optical transport section (OTS). The OCh further includes three sub-layers: an optical channel payload unit-k (OPUk), an optical channel data unit-k (ODUk), and an optical channel transport unit-k (OTUk). Each sub-layer has a corresponding overhead (OH) and function to support network management and monitoring. k is an order, and represents a level, and different k values support different bit rates correspondingly. In the OTN, different protection modes may be adopted to effectively improve the survivability of services. In an existing synchronous digital hierarchy (SDH) field, a multiplex section (MS) SPRing may be realized through VC cross. However, the MS SPRing in the SDH field cannot be easily transplanted to the OTN. An OTN system has multiple ODU levels numbered 0, 1, 2, 2e, 3, 4, and so on. Problems such as how to monitor signal quality to trigger a switching, how to transfer APS information, and how to coordinate protections of a multi-level ODUk are difficult to be solved. Currently, a scheme of ODU SPRing exists in the OTN. In an implementation scheme of the existing ODU SPRing, when the system has a multi-level ODU service, a switching is performed through cross of each level of the ODUk, which may realize only protection for the current level of the ODUk, that is, the current level of the ODUk is regarded as a protection granularity. For example, the system has three levels of ODUs, which are respectively ODU2, ODU1, and ODU0, and one ODU2 may include 4 ODU1s or 8 ODU0s. A switching through cross of the ODU1 is performed to realize protection of an ODU1 level, and a switching is performed through cross of the ODU0 so as to realize protection of an ODU0 level. When multiple client services are multiplexed to the ODU2, and the multiple client services all need protection, if the protection of the ODU1 is adopted, 4 protection groups need to be created; and if the protection of the ODU0 is adopted, 8 protection groups need to be created.

The prior art has the following disadvantages: if a low order (LO) ODU is taken as a protection granularity, the number of protection groups is larger, and required switching time is long, which may even exceed a threshold of the switching time (50 ms), and consequently, the switching cannot be performed smoothly.

SUMMARY

The embodiments of the present invention provide a method and a device for realizing an ODU SPRing, so as to solve the problems in the prior art that the number of protection groups is larger and the switching time is long.

A method for realizing an ODU SPRing provided in an embodiment of the present invention includes: first, receive an ODUj, wherein the ODUj carries an ODUi; then, perform de-multiplexing processing to obtain the ODUi from the ODUj; next, multiplex the ODUi to an optical channel data unit k (ODUk); meanwhile, keep monitoring the ODUk; and when the monitoring result that is obtained through monitoring the ODUk indicates that a failure occurred, perform a switching on the ODUi; wherein i, j, k are integers equal to or larger than 0, k is larger than j, j is larger than i, and i, j, k are used to indicate different rates of respective optical channel data unit (ODU) signals.

An apparatus for realizing service data protection in an optical channel data unit (ODU) shared protection ring (SPRing), comprising a processor and a computer readable medium having a plurality of computer executable instructions stored thereon which, when executed by the processor, cause the processor to implement: receiving an optical channel data unit j (ODUj), wherein the ODUj carries an optical channel data unit i (ODUi); performing de-multiplexing processing to obtain the ODUi from the ODUj; multiplexing the ODUi to an optical channel data unit k (ODUk); monitoring the ODUk; and when the monitoring result that is obtained through monitoring the ODUk indicates that a failure occurred, performing a switching on the ODUi; wherein i, j, k are integers equal to or larger than 0, k is larger than j, j is larger than i, and i, j, k are used to indicate different rates of respective optical channel data unit (ODU) signals.

It can be known from the preceding technical solutions that, in the embodiments of the present invention, a first ODU SPRing is realized by the switching performed through cross of the second ODU, where the first ODU is taken as the protection granularity. Since an order of the first ODU is higher than that of the second ODU, multiple second ODUs may be multiplexed to one first ODU. Therefore, by taking the first ODU as the protection granularity, the number of protection groups may be reduced, and a switching process may be accelerated.

DETAILED DESCRIPTION OF THE ILLUSTRATIVE EMBODIMENTS

The technical solutions in the present invention are described in further detail in the following with reference to accompanying drawings and embodiments.

Figure 1:
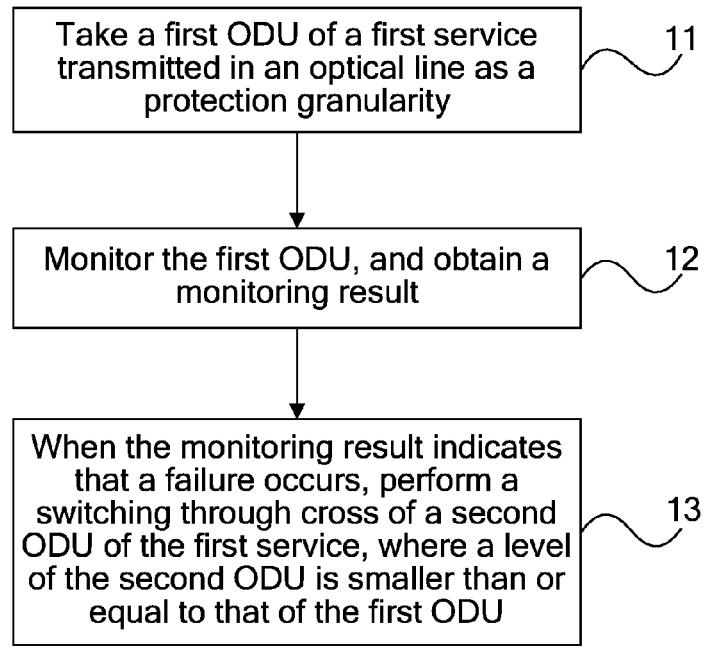
FIG. 1 is a schematic flow chart of a method according to a first embodiment of the present invention.

FIG. 1 is a schematic flow chart of a method according to a first embodiment of the present invention. The method includes:

Step 11: A monitoring endpoint takes a first ODU of a first service transmitted in an optical line as a protection granularity, where the first ODU is an ODUk that is directly multiplexed to the optical line.

Step 12: The monitoring endpoint monitors the first ODU, and obtains a monitoring result.

Step 13: When the monitoring result indicates that a failure occurs, the monitoring endpoint performs a switching through cross of a second ODU of the first service, where the second ODU is an ODUm that is multiplexed to the first ODU, and m is smaller than or equal to k.

In this embodiment, a first ODU SPRing is realized by the switching performed through cross of the second ODU, where the first ODU is taken as the protection granularity. Since an order of the first ODU is higher than that of the second ODU, multiple second ODUs may be multiplexed to one first ODU. Therefore, by taking the first ODU as the protection granularity, the number of protection groups may be reduced, and a switching process may be accelerated.

When the first service includes two levels of ODUs, taking the first embodiment as an example, when m is smaller than k, in the embodiments described in the following, an ODU with a high level (for example, the ODUk) is referred to as a high order (HO) ODU, and an ODU with a low level (for example, the ODUm) is referred to as a low order (LO) ODU.

In order to better understand the embodiments of the present invention, a signal in an OTN that the embodiments of the present invention are based on is described first. The OTUk is a frame with 4 rows and 4080 bytes, including an OPUk payload part, an OTUk forward error correction (FEC) part, and an OH part.

Figure 2:
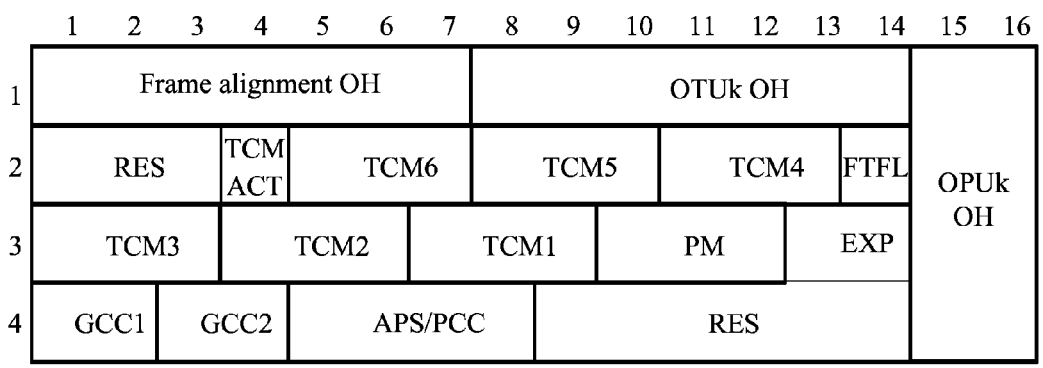
FIG. 2 is a schematic structural diagram of an OUTk OH part adopted in the first embodiment of the present invention.

FIG. 2 is a schematic structural diagram of an OUTk OH part adopted in the first embodiment of the present invention. Referring to FIG. 2, the OH part includes an OPUk OH, an ODUk OH, and an OTUk OH. The OPUk OH occupies bytes of the fifteenth and sixteenth columns in the first to fourth rows; the ODUk OH occupies bytes of the first to fourteenth columns in the second to fourth rows; the OTUk OH occupies bytes of the eighth to fourteenth columns in the first row; and a frame alignment OH occupies bytes of the first to seventh columns in the first row.

In the prior art, Tandem Connection Monitoring (TCM) is used for monitoring, and the TCM triggers a switching. However, since one level of the TCM is occupied in this mode, other protection modes that must use the TCM, such as Sub-network Connection/Sublayer Monitoring (SNC/S), cannot adopt the level of the TCM within a range of this SPRing. In addition, in the prior art, an Automatic Protection Switching/Protection Communication Channel (APS/PCC) is divided by adopting a value of 6, 7, and 8 bit of a multiframe alignment signal (MFAS) and by binding with a monitoring mode, so that it is not easy to determine which one should be assigned to an ODUk SPRing for protection.

Therefore, in this embodiment of the present invention, protection groups may be monitored by monitoring a path monitoring (PM) of the HO ODU, and the PM of the HO ODU triggers the switching. An APS/PCC OH of the HO ODU serves as a channel for transferring APS information of the protection groups, and the APS/PCC may be divided through a field value of the MFAS. In this way, the TCM is not occupied, so that the protection mode in this embodiment of the present invention may co-exist with other protection modes. For example, the division is performed by using the sixth to eighth bits of the MFAS, and a value of "000" of the sixth to eighth bits indicates that an APS/PCC byte is used in a scheme adopted in this embodiment of the present invention that HO ODU protection is realized through cross of an LO ODU.

Figure 3:
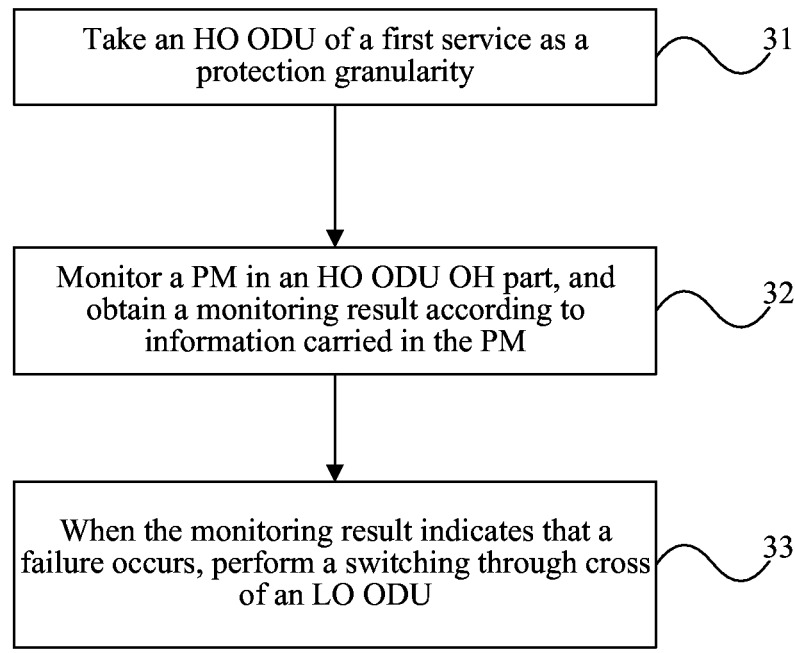
FIG. 3 is a schematic flow chart of a method according to a second embodiment of the present invention.

FIG. 3 is a schematic flow chart of a method according to a second embodiment of the present invention. The method includes the following steps.

Step 31: A monitoring endpoint takes an HO ODU of a first service transmitted in an optical line as a protection granularity for protection.

Step 32: The monitoring endpoint monitors a PM of an ODU OH part of the HO ODU, and obtains a monitoring result according to information carried in the PM.

Step 33: When the monitoring result indicates that a failure occurred, the monitoring endpoint performs a switching through cross corresponding to an LO ODU of the first service.

Figure 4:
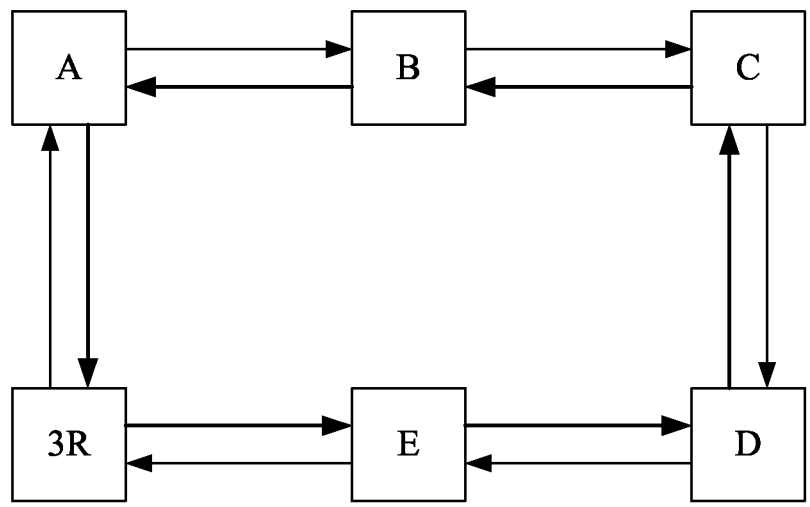
FIG. 4 is a schematic structural diagram of a system corresponding to the second embodiment of the present invention.

The mode adopted in this embodiment of the present invention that the PM of the HO ODU triggers the switching may support protection across a 3R node. FIG. 4 is a schematic structural diagram of a system corresponding to the second embodiment of the present invention. The system includes five nodes A to E. A service enters a ring from the node A and leaves the ring from the node E, and signal quality among A to E needs to be monitored. The node A is used to bring in a client service, and it is assumed that the client service is an OTU1 service. At the node A, an ODU1 of client service data is multiplexed to an ODU2, and then transmitted through an optical line. Therefore, in this embodiment, an HO ODU is the ODU2, and an LO ODU is the ODU1. It is assumed that a 3R node is further included in this embodiment (an OTU OH part is terminated and regenerated at the 3R node), and a switching is triggered by monitoring a PM of the ODU2. It is analyzed in the following why the PM of the ODU2 needs to be used for triggering the switching. It is assumed that a PM of the ODU1 is used for triggering the switching, however, because the ODU1 is generated outside the node A (because the ODU1 is multiplexed to the ODU2 at the node A, the ODU1 exists before the node A), the PM of the ODU1 is generated outside the node A accordingly, and the monitoring of the PM starts working at a PM generation point, if the PM of the ODU1 is adopted for monitoring, a monitoring range is not from the node A to the node E. It is assumed that an PM of the OTU2 is used for triggering the switching, however, because this system has a 3R node, and the PM is terminated and regenerated at the 3R node, the monitoring range is between the 3R node and the node E, which also does not meet the requirement of this embodiment for monitoring the range from the node A to the node E. Since the PM of the ODU2 is terminated and regenerated at a place that a service enters or leaves the ring (for example, the node A or the node E), it is appropriate to trigger the switching by using the PM of the ODU2.

In this embodiment, the PM is used for triggering the switching, and the TCM does not need to be occupied, so that other protection modes that must use the TCM (for example, an SNC/S) may also be adopted conveniently. In addition, an APS/PCC is divided by a value of 6, 7, and 8 bit of the MFAS, which is not limited to be bound with a monitoring mode.

An OTN system may include multiple hierarchies, and in order to remain that a first-level protection is realized through a second-level ODU, processes of de-multiplexing and multiplexing may be performed at a node where a hierarchy is added, so as to maintain the second-level ODU.

Figure 5:
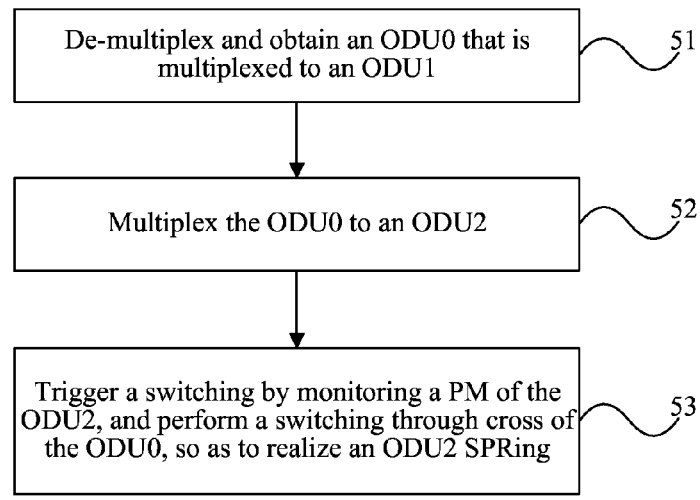
FIG. 5 is a schematic flow chart of a method according to a third embodiment of the present invention.
Figure 6:
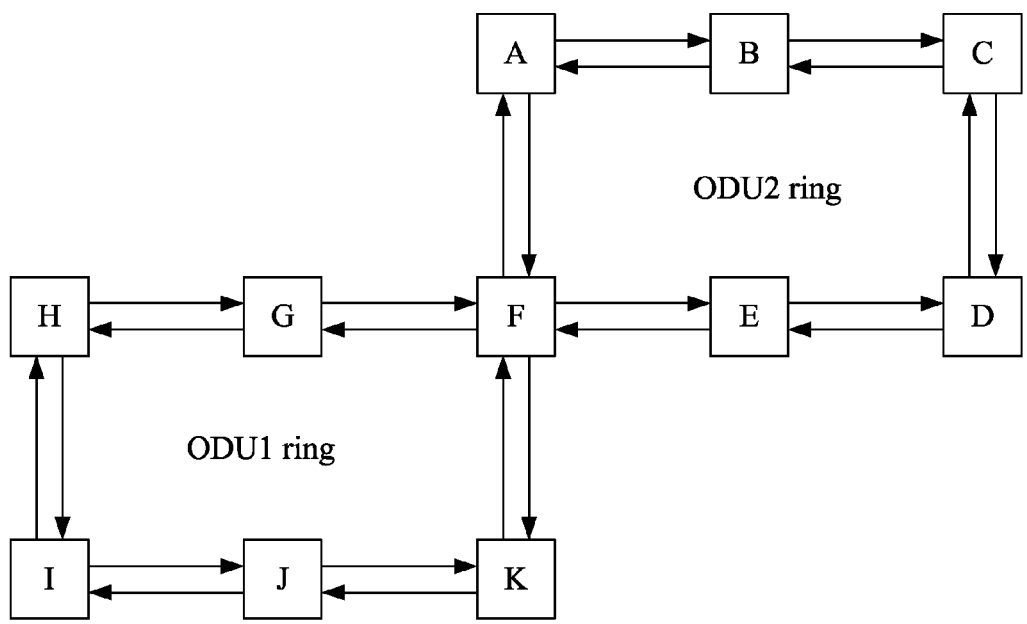
FIG. 6 is a schematic structural diagram corresponding to the third embodiment of the present invention.

FIG. 5 is a schematic flow chart of a method according to a third embodiment of the present invention, and FIG. 6 is a schematic structural diagram corresponding to the third embodiment of the present invention.

Referring to FIG. 6, it is assumed that the system has three hierarchies, HGFKJI are corresponding to an ODU1 ring, that is, the ODU1 ring includes two levels of ODUs: an ODU0 and an ODU1, and the ODU0 is multiplexed to the ODU1. When protection of the ODU1 ring needs to be realized, a switching may be triggered by monitoring a PM of the ODU1, and the switching is performed through cross of the ODU0. It is assumed that a service needs to be multiplexed to an ODU2 at a node F, and nodes F, A, B, C, D, and E are corresponding to an ODU2 ring, that is, an HO ODU is the ODU2.

To maintain the simplicity of protection hierarchies, two levels of the ODUs may still be maintained when the system has multiple hierarchies. Referring to FIG. 5, this embodiment includes:

Step 51: A node where a hierarchy is added (a node F in this embodiment) performs de-multiplexing processing on an input second service, and obtains an ODUi of the second service. The second service includes the ODUi and an ODUj, and the ODUi is multiplexed to the ODUj, where i is smaller than j. In this embodiment, the ODUi is an ODU0, and the ODUj is an ODU1.

Step 52: The node (F) where the hierarchy is added multiplexes the ODUi (the ODU0) to an HO ODU of a first service (an ODU2 in this embodiment).

Step 53: In a ring (an ODU2 ring) corresponding to the first service, a switching is triggered by monitoring a PM of the HO ODU (the ODU2), and the switching is performed through cross of the ODUi (the ODU0), so as to realize an ODU2 SPRing and protection of the first service.

In this embodiment, the de-multiplexing processing is performed first, so that the simplicity of the hierarchies of service data may be maintained, and an existing second-level ODU may be used simply to implement a scheme of an ODU SPRing.

Definitely, when the system has more hierarchies, a multilayer ODU may also be maintained to realize multi-level protection.

Figure 7:
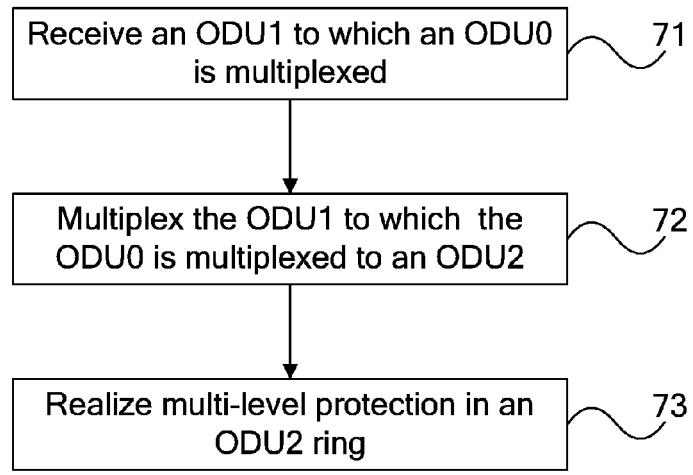
FIG. 7 is a schematic flow chart of a method according to a fourth embodiment of the present invention.
Figure 8:
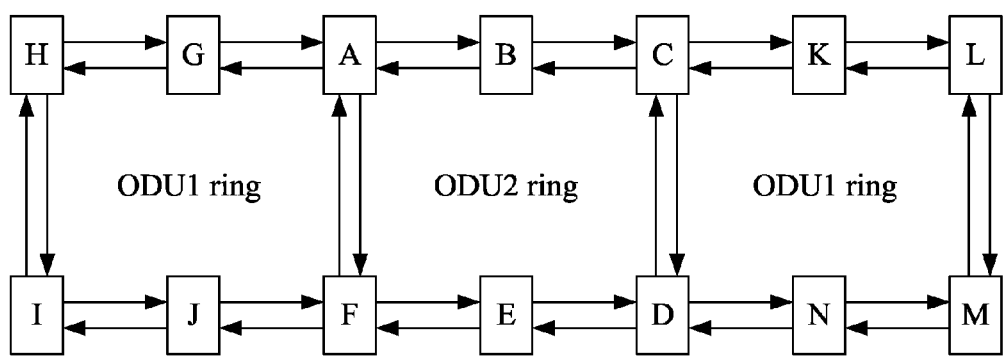
FIG. 8 is a schematic structural diagram corresponding to the fourth embodiment of the present invention.

FIG. 7 is a schematic flow chart of a method according to a fourth embodiment of the present invention, and FIG. 8 is a schematic structural diagram corresponding to the fourth embodiment of the present invention.

Referring to FIG. 8, it is assumed that a system has three hierarchies, and nodes H, G, J, and I correspond to an ODU1 ring; that is, the ODU1 ring includes two levels of ODUs: an ODU0 and an ODU1, and the ODU0 is multiplexed to the ODU1. When protection of the ODU1 ring needs to be realized, a switching may be triggered by monitoring a PM of the ODU1, and the switching is performed through cross of the ODU0. It is assumed that a service needs to be multiplexed to an ODU2 at a node A, and nodes A, B, C, D, E, and F correspond to an ODU2 ring. In addition, nodes K, L, M, and N form another ODU1 ring. In order to realize multi-level protection, the node A may directly multiplex the ODU1 that includes the ODU0. Referring to FIG. 7, this embodiment includes the following steps.

Step 71: A service entrance point (the node A in this embodiment) on a first service monitoring ring (the ODU2 ring in this embodiment) receives a second service. The second service includes an ODUi and an ODUj, and the ODUi is multiplexed to the ODUj, where i is smaller than j. In this embodiment, the ODUi is the ODU0, and the ODUj is the ODU1.

Step 72: The service entrance point (A) multiplexes the ODUj to which the ODUi is multiplexed (the ODU1 that includes the ODU0) to an HO ODU (the ODU2) of the first service.

Step 73: Multi-level protection is realized in a ring corresponding to the first service (the ODU2 ring).

The multi-level protection refers to that in the ODU2 ring, protection of the ODU2 may be realized, and protection of the ODU1 may also be realized.

The protection of the ODU2 may be realized in the following manner. The ODU2 is taken as a protection group, a switching is triggered by monitoring a PM of the ODU2, and then the switching may be performed through cross of the ODU1 that includes the ODU0, or the switching may be performed through cross of the ODU0.

The protection of the ODU1 may be realized in the following manner. The ODU1 is taken as a protection group, a switching is triggered by monitoring a PM of the ODU1, and then the switching is performed through cross of the ODU0.

In this embodiment, the multi-level protection is realized by directly multiplexing the ODUj that includes the ODUi to an ODUk with a higher order, so that the protection is more comprehensive.

Figure 9:
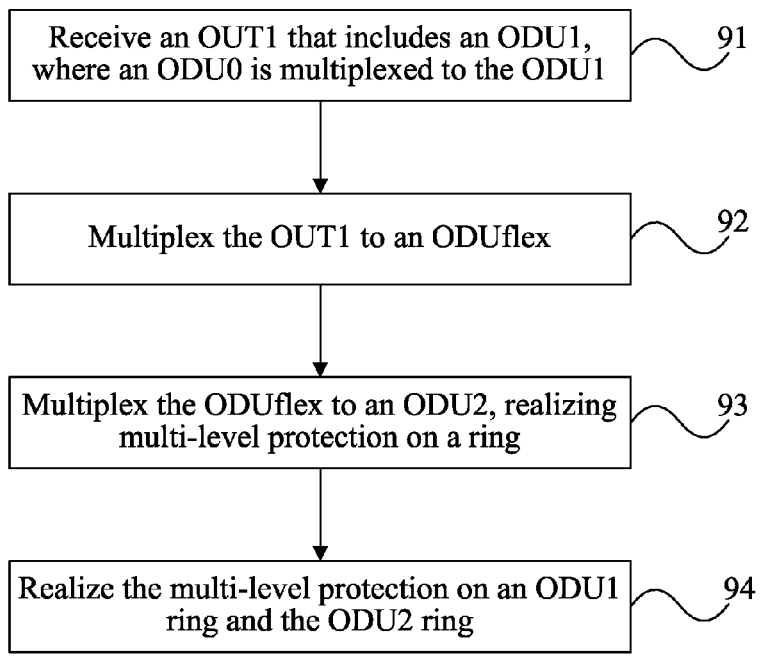
FIG. 9 is a schematic flow chart of a method according to a fifth embodiment of the present invention.

FIG. 9 is a schematic flow chart of a method according to a fifth embodiment of the present invention, and in this embodiment, reference may also be made to the schematic structural diagram shown in FIG. 8. A difference from the fourth embodiment lies in that, in the fourth embodiment, the ODU1 of the second service is multiplexed to the ODU2 of the first service, while in this embodiment, an OTU1 of a second service (an OTU is a basic unit when being transmitted in an optical line, which includes an ODU, and when the ODU is needed in the preceding description, the ODU is extracted from the OTU) is multiplexed to an ODUflex as a whole, and then the ODUflex is multiplexed to an ODU2. Referring to FIG. 9, this embodiment includes the following steps.

Step 91: A service entrance point (a node A in this embodiment) on a first service monitoring ring (an ODU2 ring in this embodiment) receives a second service. The second service includes an ODUi and an ODUj, and the ODUi is multiplexed to the ODUj, where the ODUj is included in an OTUj. In this embodiment, the ODUi is an ODU0, the ODUj is an ODU1, and the OTUj is an OTU1.

Step 92: The service entrance point (A) multiplexes the OTUj (the OTU1) to an ODUflex.

Step 93: The service entrance point (A) multiplexes the ODUflex to an HO ODU of the first service (an ODU2 in this embodiment).

Step 94: Multi-level protection is realized in rings (an ODU2 ring and an ODU1 ring in this embodiment respectively) corresponding to the first service and the second service.

The multi-level protection refers to that in the ODU2 ring, protection of the ODU2 may be realized, and in the ODU1 ring, protection of the ODU1 may be realized.

The protection of the ODU2 may be realized in the following manner. The ODU2 is taken as a protection group, a switching is triggered by monitoring a PM of the ODU2, and then the switching is performed through cross of the ODUflex.

The protection of the ODU1 may be realized in the following manner. The ODU1 is taken as a protection group, a switching is triggered by monitoring a PM of the ODU1, and then the switching is performed through cross of the ODU0.

Definitely, it can be understood that in the fourth embodiment as shown in FIG. 7, the ODU1 and the ODU2 also form a multi-level protection ring.

In this embodiment, the multi-level protection is realized by directly multiplexing the OTU as a whole to the ODUflex, and then multiplexing the ODUflex to the HO ODU, so that the protection is more comprehensive.

In a system that has multiple protection rings, the protection rings may be monitored respectively to realize cooperation among multiple levels. For example, referring to FIG. 8, it is assumed that a service of the nodes H to L needs to be monitored, when a problem occurs between the nodes A and B, the PM of the ODU2 on the ODU2 ring may discover the problem, and therefore, the protection of the ODU2 may be triggered to perform a switching by monitoring the PM of the ODU2 on the ODU2 ring so as to realize the protection; when a problem occurs between the nodes K and L, the PM of the ODU1 on the ODU1 ring may discover the problem, and therefore, the protection of the ODU1 may be triggered to perform a switching by monitoring the PM of the ODU1 on the ODU1 ring so as to realize the protection.

Figure 10:
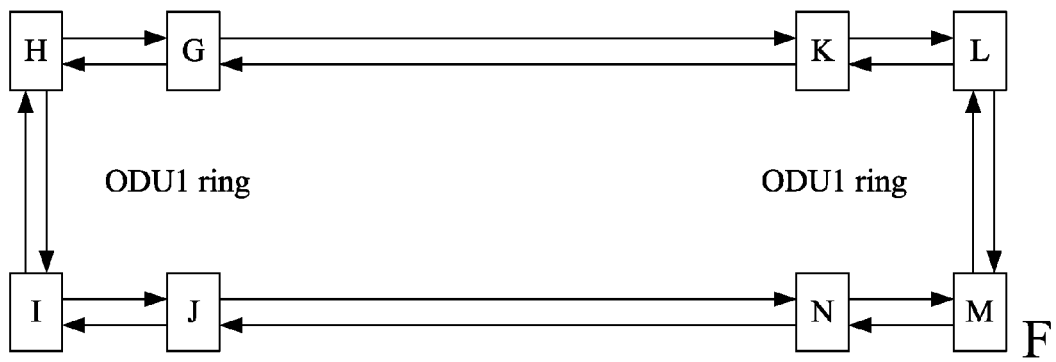
FIG. 10 is a schematic diagram of cross-ring protection corresponding to the fourth or fifth embodiment of the present invention.

FIG. 10 is a schematic diagram of cross-ring protection corresponding to the fourth or fifth embodiment of the present invention. Referring to FIG. 10, the cross-ring protection may be realized through the respective monitoring described in the preceding. It can be known from the preceding analysis that protection of an ODU1 SPRing in this embodiment may be realized by crossing an ODU2 ring.

In this embodiment, when the protection is multiple-level, the cross-ring protection may be realized by respectively monitoring different levels of monitoring rings.

When only a single-level ODU exists in a system, the ODU in this level may be considered as an HO ODU, and may also be considered as an LO ODU, and protection of the single-level ODU may also be realized by using the method described in the preceding.

Figure 11:
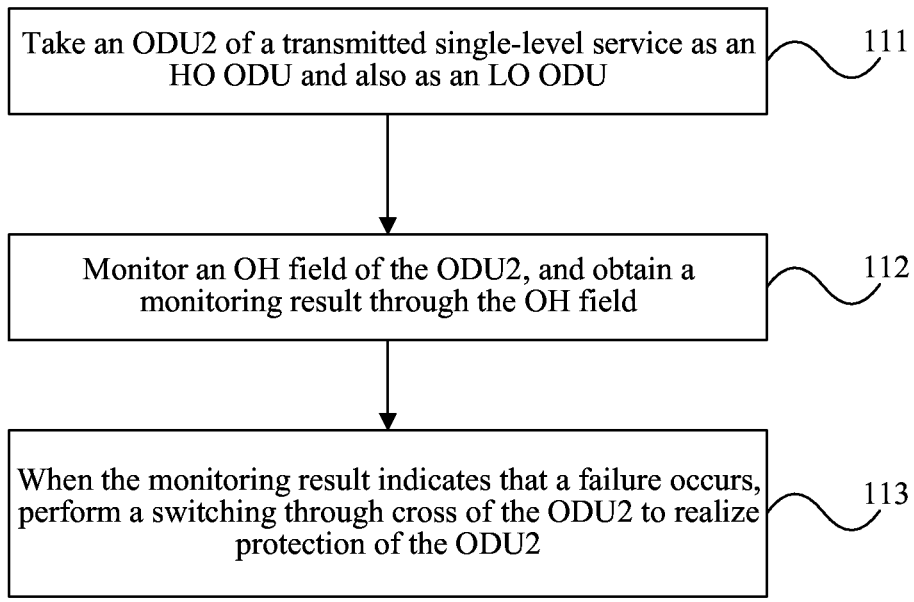
FIG. 11 is a schematic flow chart of a method according to a sixth embodiment of the present invention.
Figure 12:
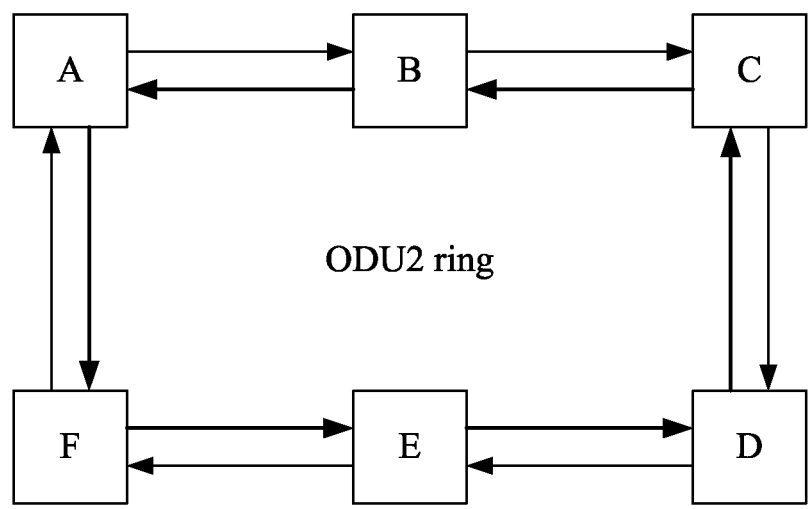
FIG. 12 is a schematic structural diagram corresponding to the sixth embodiment of the present invention.

FIG. 11 is a schematic flow chart of a method according to a sixth embodiment of the present invention; and FIG. 12 is a schematic structural diagram corresponding to the sixth embodiment of the present invention. This embodiment is directed to a scenario where only a single-level ODU exists in a system. Referring to FIG. 12, in this embodiment, it is assumed that only a service of an ODU2 exists in the system, and nodes A, B, C, D, E, and F form an ODU2 ring.

Referring to FIG. 11, this embodiment includes the following steps.

Step 111: A monitoring endpoint takes an ODU (an ODU2 in this embodiment) of a single-level service transmitted in an optical line as an HO ODU and also as an LO ODU.

Step 112: The monitoring endpoint monitors an OH field of the ODU2, and obtains a monitoring result through the OH field.

Specifically, when a service brought in by a node is an OTU service (OTU2), a TCM6 field of the ODU2 needs to be monitored, and the monitoring result is carried by this field; and when the service brought in by the node is a non-OTU service (for example, an STM-64 service), a PM field of an ODU2 OH may be monitored to obtain a monitoring result. The reason of the preceding operation is that, when the service brought in by the node is the OTU service, it indicates that the OTU exists before the service is brought in, and a corresponding PM is generated before the service is brought in. In this way, if a switching is still triggered by using the PM, a monitoring range is not consistent with a range that needs to be monitored, which may cause a false switching.

Step 113: When the monitoring result indicates that a failure occurs, a switching is performed through cross of the ODU2 to realize protection of the ODU2.

In this embodiment, when a single-level ODU exists in the system, the protection is realized by taking the single-level ODU as an HO ODU and also as an LO ODU.

Figure 13:
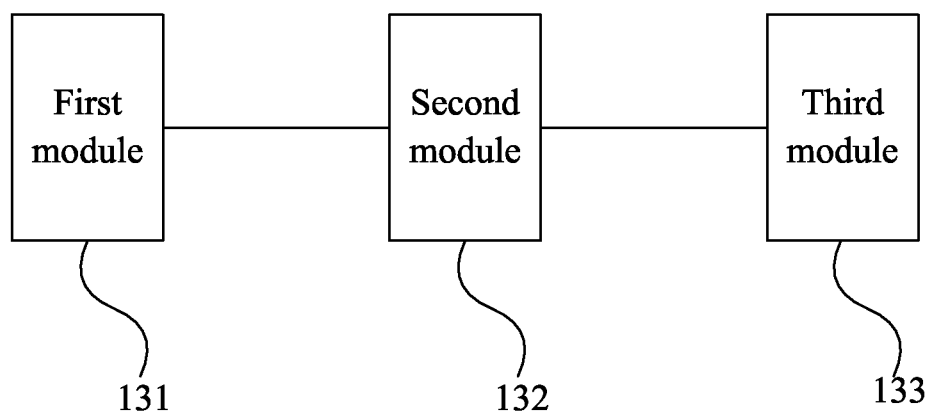
FIG. 13 is a schematic structural diagram of a device according to a seventh embodiment of the present invention.

FIG. 13 is a schematic structural diagram of a device according to a seventh embodiment of the present invention. The device includes a first module 131, a second module 132, and a third module 133. The first module 131 is configured to take a first ODU of a first service transmitted in an optical line as a protection granularity, where the first ODU is an ODUk that is directly multiplexed to the optical line. The second module 132 is configured to monitor the first ODU, and obtain a monitoring result. The third module 133 is configured to perform a switching through cross of a second ODU of the first service when the monitoring result indicates that a failure occurs, where the second ODU is an ODUm that is multiplexed to the first ODU, and m is smaller than or equal to k.

This embodiment may further include a fourth module, connected to the first module, and configured to receive a second service. The second service includes an ODUj to which an ODUi is multiplexed, where i is smaller than j. A service entrance point multiplexes the ODUj to which the ODUi is multiplexed to the ODUk of the first service. At this time, the third module is specifically configured to perform a switching through cross of the ODUj to realize protection of the ODUk, or perform a switching through cross of the ODUi to realize the protection of the ODUk.

Alternatively, this embodiment may further include a fifth module, connected to the first module, and configured to receive the second service. The second service is an OTUj that includes the ODUj to which the ODUi is multiplexed, where i is smaller than j. The service entrance point multiplexes the OTUj to an ODUflex, and multiplexes the ODUflex to the ODUk of the first service. At this time, the third module is specifically configured to perform a switching through cross of the ODUflex to realize the protection of the ODUk.

This embodiment may further include a sixth module, connected to the first module, and configured to receive the second service, where the second service includes the ODUj to which the ODUi is multiplexed, and i is smaller than j; perform de-multiplexing processing on the second service, and obtain the ODUi from the second service; and multiplex the ODUi to the ODUk of the first service. At this time, the third module is specifically configured to perform a switching through cross of the ODUi to realize the protection of the ODUk.

The second module is specifically configured to monitor a PM of an ODU OH of the first ODU, and obtain a monitoring result according to information carried in the PM. The third module is specifically configured to perform a switching through cross of the second ODU according to switching request information carried in an APS/PCC in the ODU OH of the first ODU, where the APS/PCC corresponds to different protection modes according to a value of 6, 7, and 8 bit in an MFAS in the OTU OH of the first service.

In this embodiment, a first ODU SPRing is realized by the switching performed through the cross of the second ODU, where the first ODU is taken as the protection granularity. Since an order of the first ODU is higher than that of the second ODU, multiple second ODUs may be multiplexed to one first ODU. Therefore, by taking the first ODU as the protection granularity, the number of protection groups may be reduced, and a switching process may be accelerated.

Persons of ordinary skill in the art may understand that all or a part of the steps of the preceding method embodiments may be implemented by a program instructing relevant hardware. The program may be stored in a computer readable storage medium. When the program runs, the steps of the preceding method embodiments are performed. The storage medium includes any medium that is capable of storing program codes, such as an ROM, an RAM, a magnetic disk, or an optical disk.

Finally, it should be noted that the preceding embodiments are merely used for describing the technical solutions of the present invention, but are not intended to limit the present invention. Although the present invention has been described in detail with reference to the exemplary embodiments, it should be understand that persons of ordinary skill in the art may still make modifications or equivalent replacements to the technical solutions of the present invention, however, these modifications or equivalent replacements cannot make the modified technical solutions depart from the spirit and scope of the technical solutions of the present invention.

What is claimed is:

1. A method for realizing service data protection in an optical channel data unit (ODU) shared protection ring (SPRing), comprising:
   receiving, an optical channel data unit j (ODUj), wherein the ODUj carries an optical channel data unit i (ODUi);
   performing de-multiplexing processing to obtain the ODUi from the ODUj;
   multiplexing the ODUi to an optical channel data unit k (ODUk);
   monitoring the ODUk; and
   performing a switching on the ODUi when the ODUk monitoring indicates that a failure has occurred;
   wherein i, j, k are integers equal to or larger than 0, k is larger than j, j is larger than i, and i, j, k indicate different rates of respective optical channel data unit (ODU) signals.

2. The method according to claim 1, wherein monitoring the ODUk comprises monitoring a path monitoring (PM) field in an ODU overhead of the ODUk.

3. The method according to claim 1, wherein the switching on the ODUi is performed according to switching request information carried in an Automatic Protection Switching/Protection Communication Channel (APS/PCC) field in an ODU overhead of the ODUk.

4. The method according to claim 3, wherein the value of 6, 7, and 8 bits in a multiframe alignment signal (MFAS) field of an OTU signal to which the ODUk is multiplexed is 000, indicating that the APS/PCC field is used by a protection scheme where the ODUk is protected through the switching of the ODUi.

5. An apparatus for realizing service data protection in an optical channel data unit (ODU) shared protection ring (SPRing), comprising a processor and a computer readable medium having a plurality of computer executable instructions stored thereon which, when executed by the processor, cause the processor to implement:
   receiving an optical channel data unit j (ODUj), wherein the ODUj carries an optical channel data unit i (ODUi);
   performing de-multiplexing processing to obtain the ODUi from the ODUj;
   multiplexing, the ODUi to an optical channel data unit k (ODUk);
   monitoring the ODUk; and
   performing a switching on the ODUi when the ODUk monitoring indicates that a failure has occurred;
   wherein i, j, k are integers equal to or larger than 0, k is larger than j, j is larger than i, and i, j, k indicate different rates of respective optical channel data unit (ODU) signals.

6. The apparatus according to claim 5, wherein monitoring the ODUk comprises monitoring a path monitoring (PM) field in an ODU overhead of the ODUk.

7. The apparatus according to claim 5, wherein switching on the ODUi is performed according to switching request information carried in an Automatic Protection Switching/Protection Communication Channel (APS/PCC) field in an ODU overhead of the ODUk.

8. The apparatus according to claim 7, wherein the value of 6, 7, and 8 bits in a multiframe alignment signal (MFAS) field of an OTU signal to which the ODUk is multiplexed is 000, indicating that the APS/PCC field is used by a protection scheme where the ODUk is protected through the switching of the ODUi.

* * * * *